(12) United States Patent
Baker et al.

(10) Patent No.: US 8,958,931 B2
(45) Date of Patent: *Feb. 17, 2015

(54) SYSTEM AND METHOD FOR COLLECTING REMOTELY LOCATED POSITIONAL DATA

(75) Inventors: Daniel Baker, Houston, TX (US); David Cameron McNett, Houston, TX (US); Karl Lehenbauer, Houston, TX (US); Mark L. Duell, Jr., Houston, TX (US)

(73) Assignee: FlightAware, LLC, Houston, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/465,521

(22) Filed: May 7, 2012

(65) Prior Publication Data

US 2013/0297103 A1    Nov. 7, 2013

(51) Int. Cl.
*G06F 7/70* (2006.01)

(52) U.S. Cl.
USPC .............................. 701/14; 701/482; 342/454

(58) Field of Classification Search
CPC . G08G 5/0034; G08G 5/0021; G08G 5/0013; G08G 5/00; G06Q 30/02; G06Q 30/0277; G06Q 30/0256; G01S 5/0009; G01C 21/00
USPC ..................... 701/14, 482; 342/454
See application file for complete search history.

(56) References Cited

U.S. PATENT DOCUMENTS

| | | | |
|---|---|---|---|
| 5,535,412 A * | 7/1996 | Nadehara | 711/110 |
| 6,496,777 B2 | 12/2002 | Tennison et al. | |
| 7,248,219 B2 | 7/2007 | Smith et al. | |
| 7,752,302 B2 | 7/2010 | Thacher | |
| 7,961,136 B2 | 6/2011 | Stefani et al. | |
| 2008/0065480 A1* | 3/2008 | Baker et al. | 705/14 |
| 2008/0228991 A1* | 9/2008 | Ferroussat et al. | 711/100 |
| 2010/0191458 A1* | 7/2010 | Baker et al. | 701/202 |
| 2011/0292907 A1* | 12/2011 | Tieftrunk et al. | 370/331 |

OTHER PUBLICATIONS http://www.flighttradar24.com/about.php; Accessed: Apr. 10, 2012. Main Menu Screen; http://www.flighttradar24.com/about.php; Accessed: Apr. 10, 2012.

* cited by examiner

*Primary Examiner* — John Q Nguyen
*Assistant Examiner* — Jordan S Fei
(74) *Attorney, Agent, or Firm* — Woodard, Emhardt, Moriarty, McNett & Henry LLP

(57) ABSTRACT

A computer-implemented system and method for the collection, filtering, and transmission of aviation information is disclosed. A plurality of flight information is received over a digital network at various remote locations, and the data is filtered prior to transmission to a central database for presentation and use. The database includes aviation information. The method of filtration is dynamically updated as to information concerning a specific flight based on one characteristic of the flight. As to aircraft being tracked, a determination is made as to which receiver should relay collected data, and that determination is periodically revised, such as to minimize transmission costs and maximize signal quality as aircraft positions change. Once the information is located in the central database, it is suitable for use in responding to user requests for flight tracking information is association with at least one identified flight.

20 Claims, 5 Drawing Sheets

SYSTEM AND METHOD FOR COLLECTING REMOTELY LOCATED POSITIONAL DATA

FIELD OF THE INVENTION

The present invention generally relates to a system and method collecting flight tracking information from a number of remote data acquisitions sites for subsequent processing and transmission of portions of that data to a plurality of requesting users. M ore particularly, the present invention pertains to a flight tracking service accessible over the Internet which collects dynamically filtered flight tracking information collected by a remote data acquisition site for subsequent processing and transmission to requesting users.

BACKGROUND OF THE INVENTION

In 1995, the United States Federal Aviation Administration (FAA) made a wealth of minute-by-minute radar-based flight tracking information available for distribution to the public with the creation of the Aircraft Situation Display to Industry (ASDI) service. Through this service, flight tracking data is made available to several vendors from a single source. The ASDI information includes the location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included.

In addition, other sources of flight tracking information are available, including next-generation automatic dependent surveillance broadcast (ADS-B) information, which may be utilized independently or in combination with the ASDI data to provide the requested flight tracking information.

ADS-B provides real-time position information that is, in many cases, more accurate than the information available with traditional radar-based systems. ADS-B uses GPS signals along with aircraft avionics to transmit an aircraft's location from an on-board transceiver to permanent receivers located on the ground. The ground receivers then transmit that information to air traffic controllers, cockpit displays of other aircraft equipped with ADS-B avionics, and the like. An aircraft equipped with ADS-B also periodically broadcasts other relevant information such as the aircraft's identification, altitude, and velocity. Currently, this information is broadcast approximately every second.

The on-board portion of the ADS-B system relies on two avionics components: (1) a high-integrity GPS navigation source and (2) a datalink (ADS-B unit). There are several types of certified ADS-B data links, but the most common ones operate at 1090 MHz. It is expected that most, if not all, commercial aircraft will be equipped with ADS-B equipment by 2020.

A private corporation was awarded a contract in August of 2007 to build, install and maintain a nationwide network of ADS-B ground receivers. Typically, these ground receivers are located at, near, or are in direct communication with airports, as the system has an effective operating range of roughly 100 to 150 miles. It is expected that ground receivers sufficient to provide coverage for the entire airspace over the continental U.S. will be in place by 2013.

The wealth of information collected by the ADS-B service, and other information collection systems like it, is attractive to users of ADSI data, such as those who provide near real-time flight tracking information. However, given that the data includes a number of data points (i.e. location, airspeed, altitude) regarding each aircraft within its range, and that that data is received every second, the sheer volume of the data is difficult to manage. Furthermore, given that this volume of data is available at each and every ground receiver location, the amount of data available nationwide is tremendous. As a result, the task of transmitting and processing this information for subsequent use, such as for presentation to users, is an extremely difficult one. A brute force approach to the collection of this massive amount of data on a continuous basis would likely be cost prohibitive from a bandwidth and processing perspective. Some efforts to address this problem use a simple sampling, in that only every tenth or every twentieth data point collected are forwarded for later use. Even if data known compression techniques were to be used, the amount of data would still be overwhelming, and the compressions algorithms would require ample processing power at each end. Accordingly, the present invention solves a number of these problems as well as other problems present in the aviation information industry, as are illustrated in the descriptions that follow.

SUMMARY OF THE INVENTION

Various technologies and techniques are disclosed for filtering, collecting, processing, and/or transmitting flight tracking information collected from a substantially real-time source. In one embodiment, a flight tracking information service is accessible from a web-browser over the Internet and collects data from a plurality of remotely located data collection sites. The remote data collection sites adaptively filter the raw data collected and provide updated positional information associated with a specific flight, aircraft, or the like using a selected reporting frequency.

One form of the present invention is a flight tracking information service which operates on a central database of flight tracking data collected from a plurality of remotely located data collection sites. A dynamic filter is used at one or more of the data collection sites in order to efficiently provide the relevant data to the central database. The criteria for dynamically filtering can be different for different aircraft and may be a function of or include each aircraft's altitude, airspeed, turn rate, rate of climb, or a combination thereof.

Another form is a flight tracking information service which operates on a central database of flight tracking data collected from a plurality of remotely located data collection sites which are connected to ADS-B ground receivers.

Yet other forms, embodiments, objects, advantages, benefits, features, and aspects of the present invention will become apparent from the detailed description and drawings contained herein.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION OF THE SPECIFIC EMBODIMENTS

Figure 1:
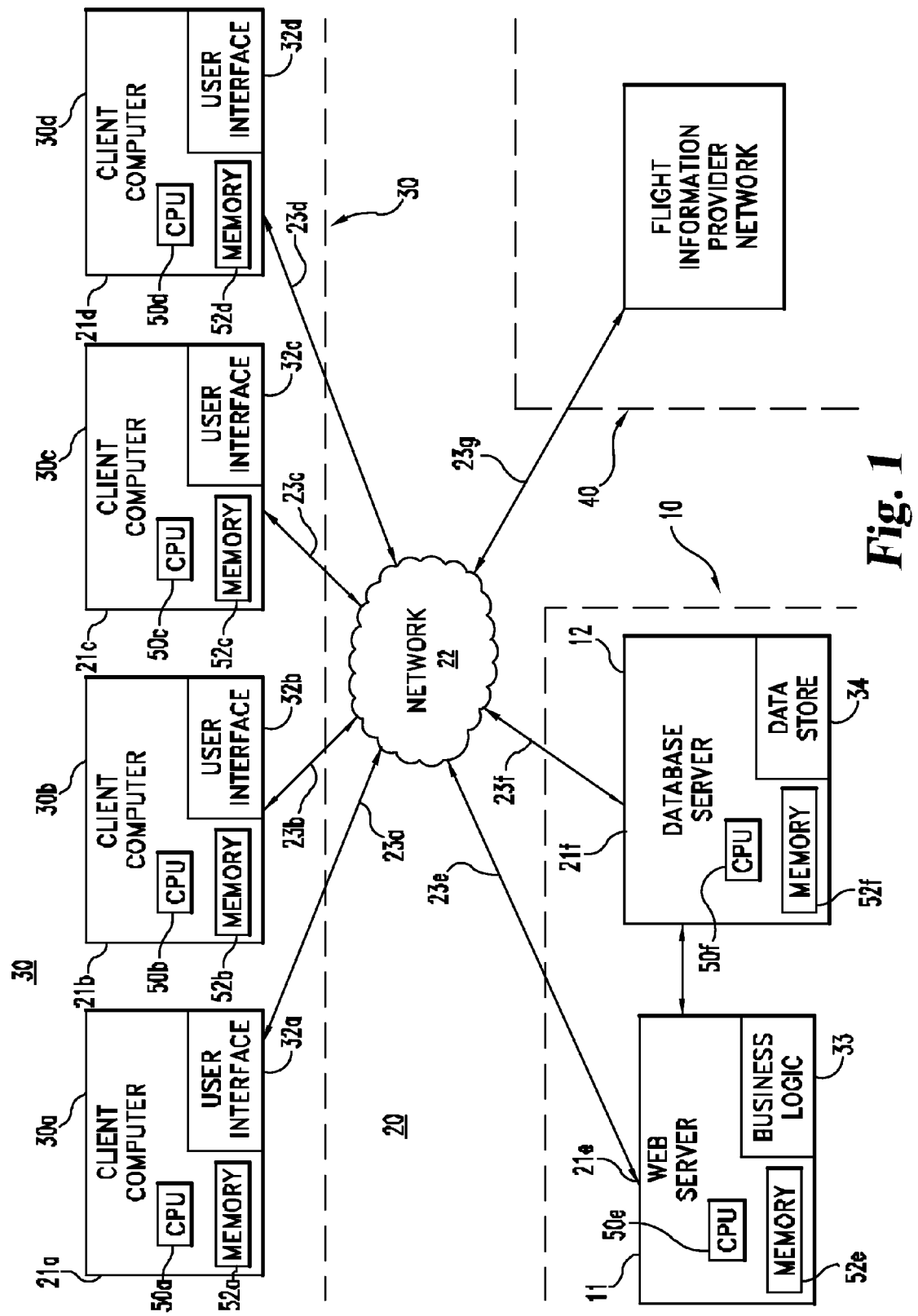
FIG. 1 is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

At any given moment there are likely to be more than 5,000 aircraft flying above the United States. In the course of a single day, more than 50,000 flights are completed from destination to destination. Currently, systems exist which provide current flight tracking information. These systems include both traditional radar systems and next generation on-board GPS-based communication systems, such as ADS-B which provides for a second-by-second positional update.

Services, website, and other outlets for accessing this information have developed which have enabled users to obtain information such as the status or progress of an aircraft using identifiers such as its flight or tail number. This enables users to check up on flights of their family or friends, business owners to maintain the current status of their aircraft, and many other related service industries to predict departure/arrival times. However, the sites must collect the most up to date information on a periodic basis. Given that the number of flights in progress at any given moment is already quite large, and will undoubtedly continue to rise as the need for commercial shipping and private passenger flights increases, the wealth of information to be collected and processed presents a significant problem, particularly in the case of collecting ADS-B data or the like, which originates from a large number of disparate collection sites across the country, with some being in remote locations. Moreover, any effort to track flights worldwide presents an even more challenging data collection, transmission, and processing feat.

FIG. 1 is a diagrammatic view of computer system 20 of one embodiment of the present invention. In the illustrative embodiment, computer system 20 includes aviation information service 10, flight information provider network 40, and client computers 30. Computer system 20 also includes computer network 22. Computer network 22 couples together a number of computers 21a-21f over network pathways 23a-23g, respectively. More specifically, system 20 includes several servers, namely Web Server 11 and Database Server 12 of aviation information service 10. It shall be appreciated that many additional servers may be included within flight information provider network 40, as will be described with respect to FIG. 2.

System 20 also includes client computers 30a, 30b, 30c, and 30d (collectively 30). While computers 21a-21f are each illustrated as being a server or client, it should be understood that any of computers 21a-21f may be arranged to include both a client and server. Furthermore, it should be understood that while seven computers 21a-21f are illustrated, more or fewer may be utilized in alternative embodiments. Preferably, service 10 includes a collection of Web servers 11 for receiving, processing, and responding to user queries.

Computers 21a-21f include one or more processors or CPUs (50a, 50b, 50c, 50d, 50e, and 50f, respectively) and one or more types of memory (52a, 52b, 52c, 52d, 52e, and 52f, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a solid state disk (SSD); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown to preserve clarity, one or more of computers 21a-21f may be coupled to a display and/or may include an integrated display. Computers 21a-21f may be of the same type, or a heterogeneous combination of different computing devices. Likewise, displays may be of the same type, or a heterogeneous combination of different visual devices. Although again not shown to preserve clarity, each computer 21a-21f may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible. It shall be appreciated that client computers 30a-30d, or any other computer 21 for that matter, may be of an alternate type, such as a mobile device utilizing the iOS, Android, or any other operating system. This specifically includes iPhones and iPads (manufactured by Apple, Inc., located at 1 Infinite Loop Cupertino, Calif. 95014), Kindles (manufactured by Amazon.com, Inc., located at 1200 12th Avenue South, Suite 1200, Seattle, Wash. 98144-2734), Android phones/tablets (manufactured by various manufacturers), and other similar devices.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21a-21f can be coupled together by computer network 22.

In one embodiment, system 20 operates at one or more physical locations. Web Server 11 is configured as a web server that hosts application business logic 33 for an aviation information engine, Database Server 12 is configured as a database server for storing aviation information provided by flight information provider network 40, and at least one of client computers 30a-30d are configured for providing a user interface 32a-32d, respectively, for accessing the aviation information service 10. Preferably, Database Server 12 maintains at least one year of historical flight tracking information, and most preferably maintains at least three years. In a further form, Database Server 12 maintains data store 34 as a memory-resident database to provide more advanced searching functionality and minimize response times. User interface 32a-32d of client computers 30a-30d can be an installable application such as one that communicates with Web Server 11, can be browser-based, and/or can be embedded software, to name a few non-limiting examples.

In one embodiment, software installed locally on client computers 30a-30d is used to communicate with Web Server 11. Alternatively, client computers 30 may be referred to herein as user devices 30. In another embodiment, Web Server 11 provides HTML pages, data from web services, and/or other Internet standard or company proprietary data formats to one or more client computers 30a-30d when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Database (data store) 34 on Database Server 12 can store data such as flight tracking information, departure/arrival notices, flight plans, historical flight information, and/or aircraft information to name a few representative examples.

Typical applications of system 20 would include more client computers like computers 30a-30d at more physical locations, but only four have been illustrated in FIG. 1 to preserve clarity. Furthermore, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by service 10, Database Server 12 includes a relational database, such as SQL, as in known to one of skill in the art.

Figure 2:
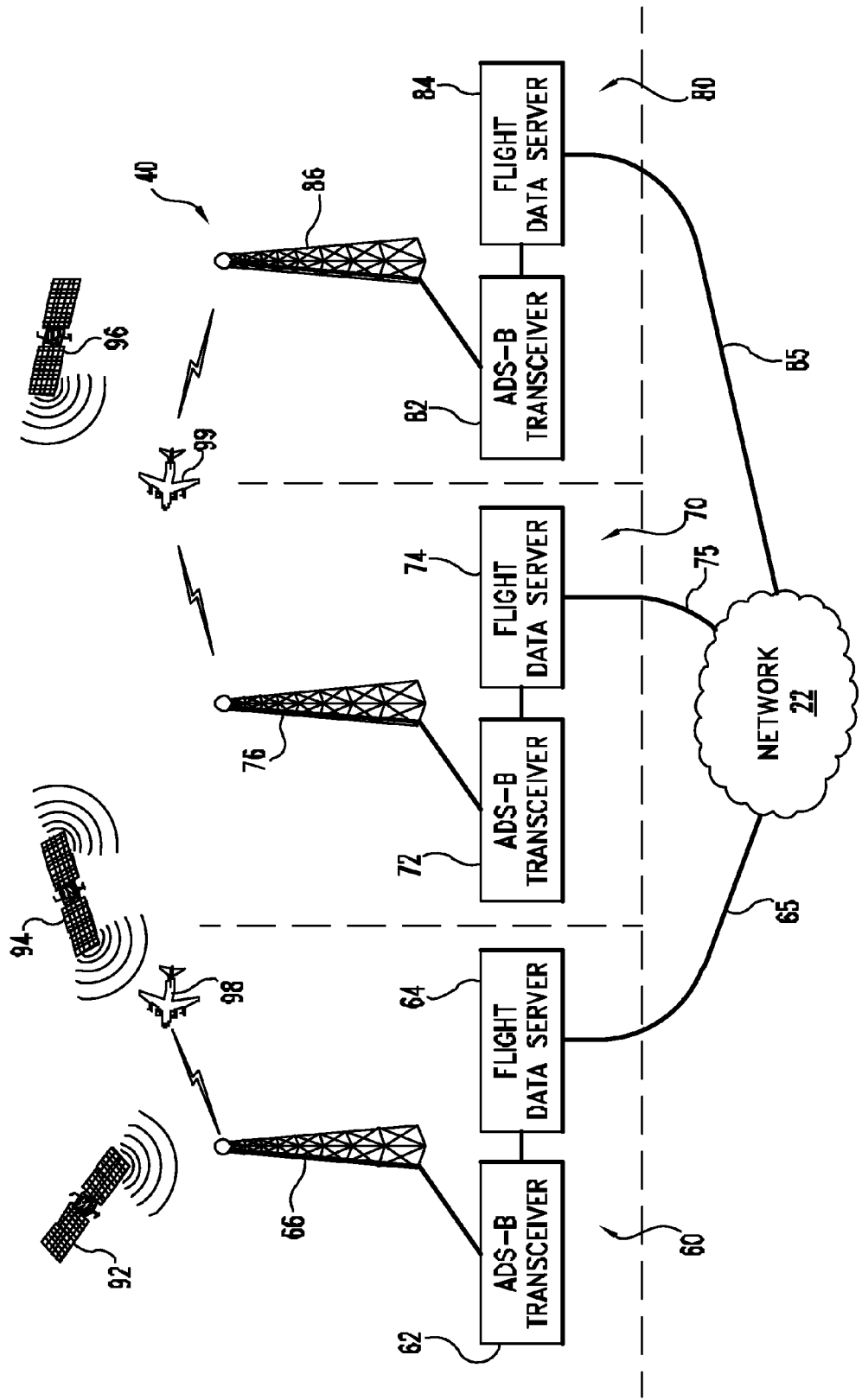
FIG. 2 is a detailed view of an exemplary Flight Information Provider Network as shown in FIG. 1.

Turning to FIG. 2, one exemplary arrangement for a number of remotely located servers which comprise flight information provider network 40 is shown. In the illustrative embodiment, three remote locations are shown, such as locations 60, 70, and 80. Each location illustrated includes an ADS-B transceiver (such as 62, 72, or 82), a flight data server (such as 64, 74, or 84) and an antenna (such as 66, 76, or 86). In each instance, the transceiver of that location is connected to both the flight data server and antenna of the same location via a series of connections and/or interfaces. It shall be appreciated that these locations may be located in a wide array, depending on the area(s) of coverage desired. However, in a broader embodiment, a very large number of locations would be included whose coverage area preferably spans a significant portion of the populated areas of the world.

Additionally shown are additional components which communicate with the flight information provider network 40 to provide flight information either directly or indirectly. Global positioning satellites 92, 94, and 96 operate in conjunction with the global positioning system (GPS) to provide signals for use in determining an accurate position of aircraft 98 and 99 by their own on-board GPS receivers. This positional information, along with other optional information, is then transmitted by transceivers on-board ADS-B equipped aircraft, such as aircraft 98 and 99, on a periodic basis. These transmissions are ultimately received by antennas located across the country, such as antenna 66, 76, and/or 86, depending upon whether or not they are in range. Once received by an antenna, the information is processed by the appropriate ADS-B transceiver and ultimately stored by the corresponding flight data server, which may include a database for storing the large amounts of data received due to its periodic nature.

Figure 3:
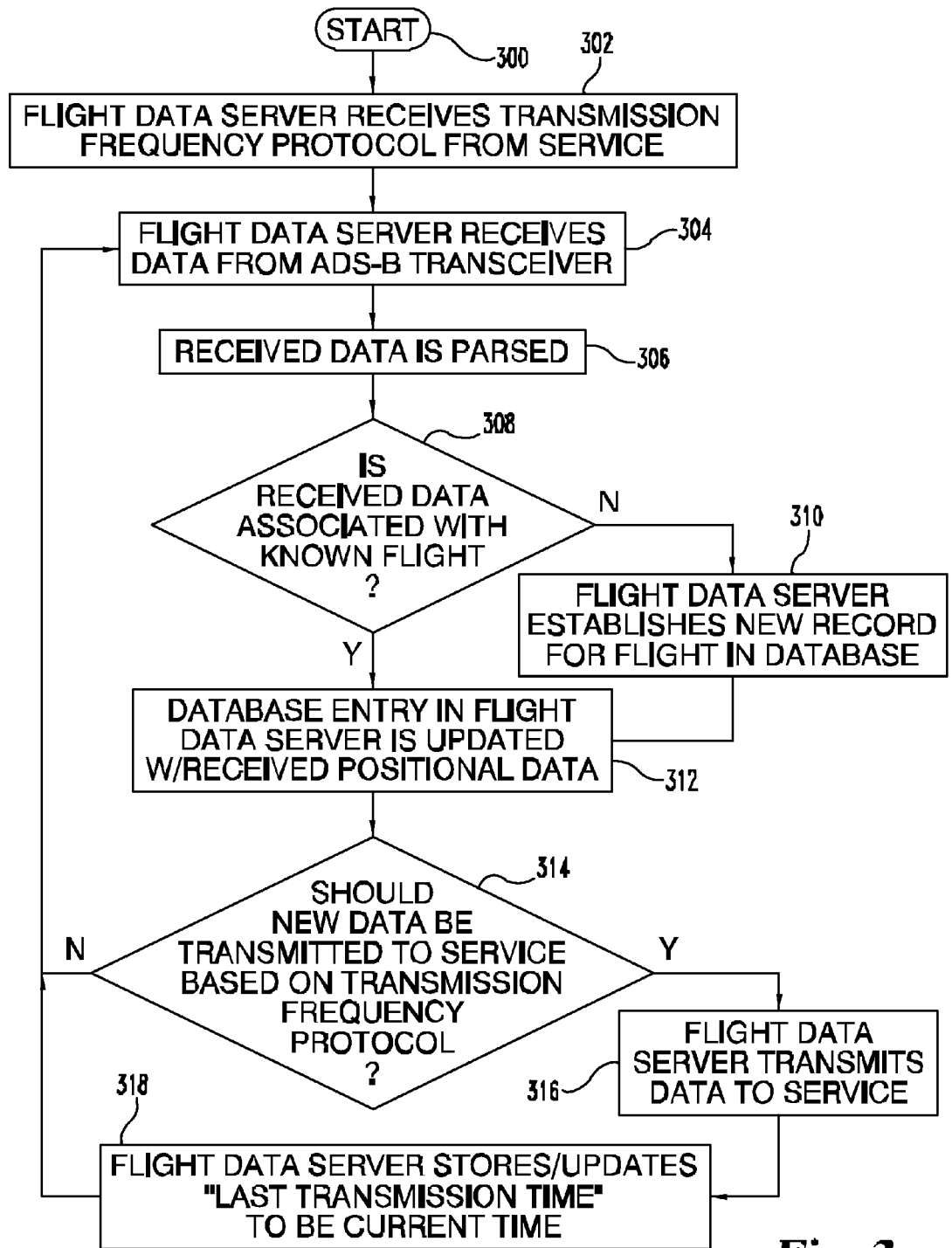
FIG. 3 is a flowchart illustrating an exemplary process for collecting and reporting flight information from a selected location, such as a location within Flight Information Provider Network of FIGS. 1 and 2.

Turning to FIG. 3, with continued reference to FIGS. 1 and 2, a flowchart illustrating the process for collecting and reporting flight information from a selected location, such as location 60 within flight information provider network 40 in conjunction with service 10 is illustrated. It shall be appreciated that this process may be performed repeatedly for each location within flight information provider network 40 to provide for a complete data set. Furthermore, it shall be appreciated that this process may only be performed for selected flights, such as flight for which the location 60 has been designated for as opposed to another location receiving reports from that flight.

The process begins at start point 300 with the service 10 sending to the flight data server 64 of location 60 a transmission frequency protocol (stage 302). The transmission frequency protocol includes specific data suitable for use by flight data server 64 to determine the frequency with which to report future flight information it receives with respect to a first selected flight, such as updated flight positioning information, to service 10. In one form, the rate is determined based upon at least one characteristic of the flight associated with the positional information, such as the status of the flight, its altitude, airspeed, turn rate, proximity to it destination, or the like, or a combination of the above. This enables flight positioning data to be reported more frequently, such as when the changes to the flight's path are likely to occur, and less frequently when changes to the flight's path are less likely to occur. Such a dynamic positional reporting frequency may be performed on an aircraft-by-aircraft basis (or flight-by-flight), and enables service 10 to determine a more accurate flight path for ultimately providing to requesting users, while minimizing the amount of data required to be transmitted over network 22. For example, during taxi, takeoff, approach, landing, and/or when the flight is in a holding pattern, the track of the aircraft is much more likely to change, thus warranting a higher positional reporting rate. However, when a flight is at cruising altitude in straight flight or waiting at a gate, the need for more frequent positional updates is reduced, as its path is either static or at least much more predictable. In one form, the positional reporting rate is once per minute during cruising, with the rate being changed by at least 25% in response to a turn, climb, descent, or other similar event. In a further form, the rate is changed by at least 50% in order to speed up or slow down updates of positional locations in order to provide more accurate data or to save computational and bandwidth resources. For purposes of illustration, the table below provides an exemplary transmission frequency protocol which provides a satisfactory level of detail as well as computational and bandwidth efficiency:

| Flight Characteristic: | Exemplary Determining Criteria | Report Rate |
|---|---|---|
| At Gate | On ground, not moving | 1 min (or only report when movement occurs) |
| Taxi | On ground, moving | 5 secs |
| Takeoff | Climb rate | 3 secs |
| Cruising | Alt >10,000, no climb rate | 30 secs |
| Banking/Altitude change | Turn rate or climb rate >.3 deg./sec. | 10 secs/turn or climb rate |
| Descent | | 10 secs |
| Holding pattern | | 2 secs |

A further form may include a number of characteristics or criteria which provide for an increase or decrease in the reporting rate associated with a flight, as opposed to a fixed reporting rate associated with each of a number of defined states. Additionally, in this further form, the adjustments made based upon one or more characteristics may be limited by a maximum report rate (such as 2 reports per second) and a minimum report rate (such as one report per 2 minutes).

The actual collection of flight positional data begins with the flight data server 64 of location 60 receiving positional information for one or more aircraft via ADS-B transceiver 62 and antenna 66 (stage 304). In one form, the positional information is stored in a database either internal or external to flight data server 64. In other forms, various other servers may process the data prior to entry into flight data server 64 or prior to its transmission to service 10. The positional information may also be stored in association with various other fields of information received, such as airspeed, altitude, and other data known to or capable of being transmitted via ADS-B.

Upon receipt, each flight information update is identified and assigned a type based upon the established formats provided by the ADS-B protocol. Once the type of the message is identified, the message is parsed (stage 306) and the data is converted into a suitable format for insertion into the database maintained by flight data server 64. In one form, stage 306 may include the decoding of a message, the conversion of binary numbers to standard integers, the conversion of characters into words, and any other data conversion that may be required based upon the format of the received message and the format of the desired information for subsequent handling.

Once the contents of the message are obtained, flight data server 64 identifies whether or not the message relates to an existing flight in its database (stage 308). In the event that the message does not relate to an existing flight, a new flight record is established and populated with the contents of the message (stage 310). For example, this may occur when a flight is first initiated, or may otherwise occur when an existing flight first comes into range of the antenna 66. If an existing flight record is found to which the contents of the message relate, or one was just created in stage 310, the contents of the message are coupled with the existing information about the flight and the flight entry is updated (stage 312).

In an alternate form, flight data server 64 utilizes a one or more storage media to implement a ring buffer (or circular buffer) for purposes of storing received flight information. A ring buffer is a data structure that uses a single, fixed-size buffer as if it were connected end-to-end. As a result of this configuration, as new data arrives and is stored, the oldest data is overwritten.

Preferably, the storage media provide sufficient storage to store at least the data received over a 24 hour period. In a further preferred form, the storage media provide sufficient storage to store at least the data received over a 5 day period. In the most preferred form, the storage media provide sufficient storage to store at least the data received over a 30 day period. Storage media sufficient to provide for these levels of storage will depends upon the amount of flight activity within range, however, sizes may include large capacity drives, such as 10 GB or larger, which may be arranged in arrays, such as a redundant array of independent disks (RAID), storage-area network (SAN) or the like.

Upon the receipt of a position of a flight, the flight data server determines if the positional data should be reported to service 10 at that time (stage 314). In the event the flight is providing the first positional data received, the flight data server 64 is set to transmit the data to service 10 in stage 316. Otherwise, the flight data server 64 determines, utilizing its stored last transmission time for that flight (as will be described later), to determine whether or not to transmit that update to service 10 based upon its current transmission frequency protocol and its known information about the flight. In the event the flight data server determines that the positional data should be transmitted, the process proceeds to stage 316 where the flight data server 64 transmits the positional data regarding the flight, among other information, across network 22 to service 10 (stage 316). Additionally, the positional data may be queued for later transmission in the event of a network outage or the like, or for transmission of a complete or more complete set of received data with respect to one or more aircrafts or flights, such as in the event an aircraft is involved in an incident, as described below.

Subsequently or concurrently, flight data server 64 also stores or updates a "last transmission time" in association with the flight of the last report made to service 10 with respect to that flight (stage 318). After stage 314 (or stage 316 if reported), the process returns to stage 304 where flight data server 64 receives a subsequent positional update corresponding to the flight and the process repeats, as described above.

Upon termination of a flight, whether received by flight data server 64 via ADS-B transceiver 62 or reported to flight data server 64 from service 10 (such as based on ASDI data or the like), the process ends as stage 320. At a later time, should the service 10 have a need for more information, the service 10 may send a request to flight data server 64 for all previously untransmitted data it may still have on hand.

Furthermore, when using a ring buffer, in the event of an event of interest, such as a near-miss, collision, crash, or the like, the aviation information service 10 may transmits requests to one or more of flight data servers 64 seeking to have all information associated with one or more flights transmitted to it. Alternatively, service 10 may request that the identified information merely be protected so as to not be overwritten or that one or more of the storage media be swapped out so as to protect the desired information as it is typically only available at the individual flight data servers 64 in its most granular level. The desired information may include positional updates transmitted every second or the like depending upon the ADS-B reporting rate. This very periodic data has tremendous value in these instances. In the event it is not requested or the storage media replaced, the data is overwritten as new data arrives.

For exemplary purposes, a representative flight data server, such as 64, located in an area of average traffic receives roughly one to seven megabits per second of raw data from its associated ADS-B transceiver. Using the method described above, this data rate can be filtered down to approximately 100-200 kilobits per second, for transmission to service 10, without any significant loss of accuracy to service 10.

Figure 4:
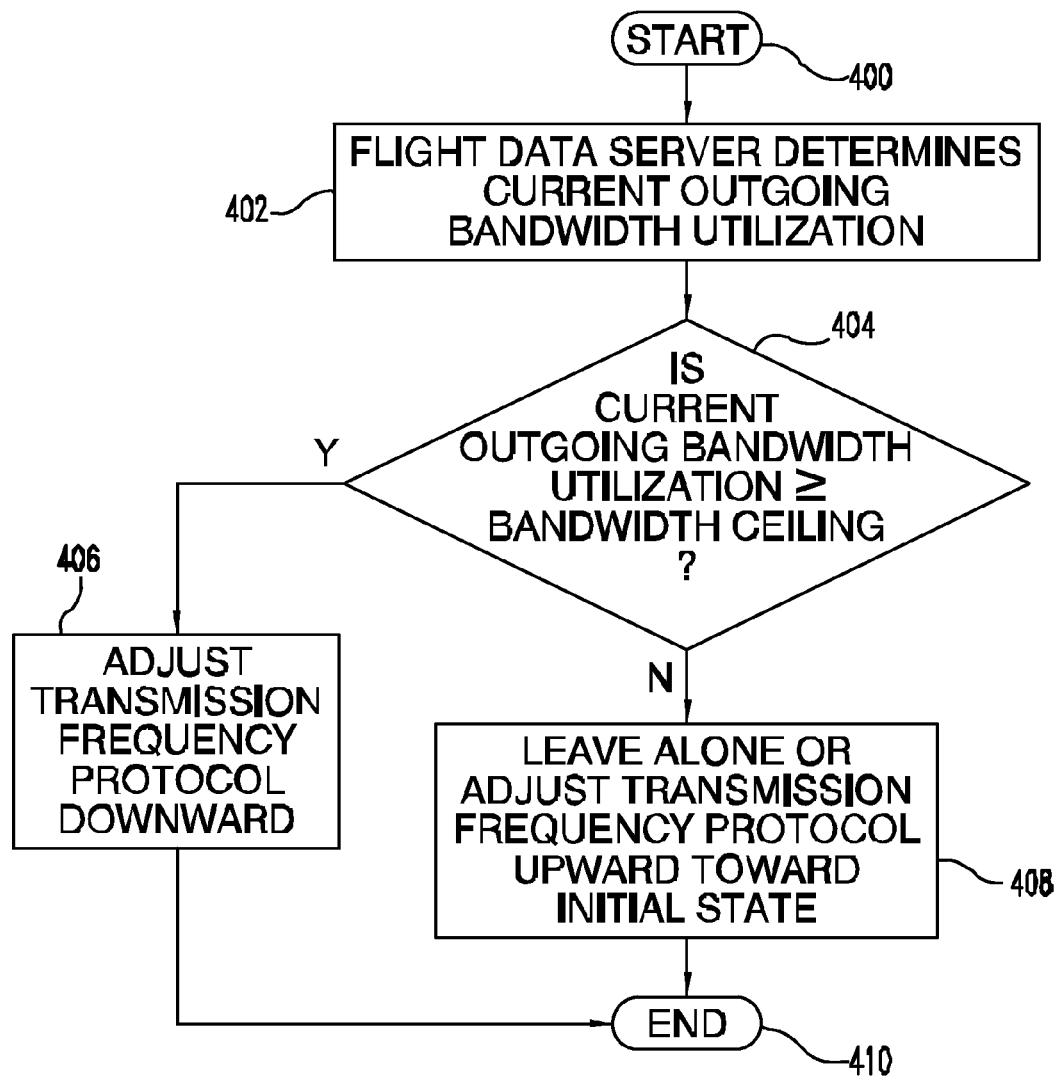
FIG. 4 is a flowchart illustrating a bandwidth limiting step which may be included within the process shown in FIG. 3.

Turning to FIG. 4, with continued reference to FIGS. 1-3, a flowchart illustrating a further step which may be included within the process shown in FIG. 3 is illustrated. In one form, the process would occur in conjunction with step 314 of the process shown in FIG. 3. For purposes of illustration, the process may be desirable when network 22 comprises a cellular modem, land-line connection, or other limited bandwidth connection, a maximum data rate becomes an issue and the transmission frequency protocol may need to be altered in its application to avoid exceeding this ceiling. The process begins at start point 400 with the flight data server 64 determining its current outgoing bandwidth utilization, which may encompass the data streams for each and every flight which is in range of its associated ADS-B transceiver (stage 402). Once determined, the current outgoing bandwidth utilization is compared to a defined bandwidth ceiling (stage 404). Alternatively, in order to act proactively, stage 404 may compare the current outgoing bandwidth utilization to a selected percentage of the defined bandwidth ceiling, such as 90%, 95%, or the like. In the event the current bandwidth utilization exceeds the bandwidth ceiling (or the selected percentage of it), the transmission frequency protocol is adjusted (stage 406). This may include decreasing the frequency of reporting across the board or making an adjustment to the reporting frequency associated with one or more triggering events. For example, in the illustrative reporting frequency described above, the reporting frequency associated with the "Cruising" state may be increased from once per 30 seconds to once per minute, or, to save more bandwidth, the frequency reporting rating for the "Holding Pattern" state may be increased from one every 3 seconds to once every 10 seconds, effectively cutting the data stream for any flight in holding pattern by approximately 70%. As will be appreciated, in the event of high traffic or a low bandwidth ceiling, the transmission frequency protocol may be reduced numerous consecutive times in order to arrive at a suitable level for providing real-time data as is possible depending upon the overall number aircrafts in range and their corresponding states.

In the event the current bandwidth utilization is below the bandwidth ceiling, either no action may be taken or the transmission frequency protocol may be adjusted upward toward normal, depending upon how close the utilization is to the ceiling (stage 408). In one form, the most recent reductions to the transmission frequency protocol may be restored to normal iteratively, so as to make a gradual increase in the bandwidth utilization. Such an algorithm provides for the desired reporting frequency when feasible while providing for a slightly reduced frequency only when required in order to work within a defined bandwidth constraint. The process ends at endpoint 410, and returns to the process of FIG. 3.

In a further form, service 10 and the various locations collaborating with it may collectively implement a location designation process for each flight. In this form, each flight would have only a single location (which is presently in range of the flight) assigned to report the positional information of that flight. This provides for both bandwidth and computational efficiency by eliminating duplicative data. In a still further form, known information about the flight, such as its projected flight path from its flight plan, may be used to assign the reporting location so as to provide for the most accurate data. In alternate form, locations in range may periodically report their signal strength, signal to noise ratios, or the like vis-á-vis a flight, which may then be used to select an assign a location to report the positional information for that flight. Additionally, bandwidth costs or bandwidth capacity or other criteria may be included in the ultimate selection of the most efficient or desired location for a flight at a given time. In a still further form, techniques from cellular networks may be utilized to provide for hand-offs from location to location under this scheme.

Figure 5:
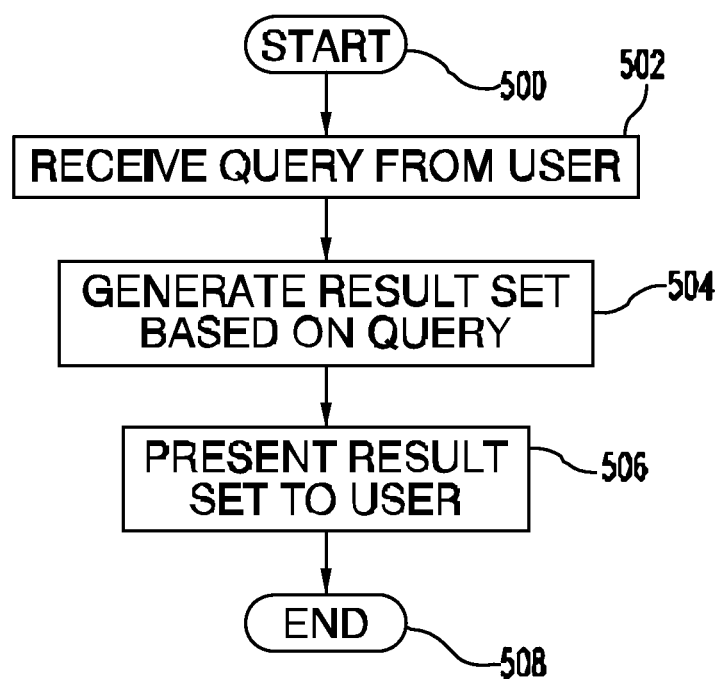
FIG. 5 is a process flow diagram illustrating the steps of receiving and responding to a user request in one embodiment of the present system and method.

Turning to FIG. 5, with continued reference to FIGS. 1-2, the process for receiving, processing, and responding to a user query is illustrated. The process begins at start point 500 with the user submitting a query (stage 502) to the aviation information service 10 using a web interface and a predetermined structured format. The user query may include either a single term or a variety of terms in combination. These terms may include flight number, tail number, departure time, departure location, arrival time, arrival location, altitude, air speed, proximity to a specific location, and/or the class of airspace (whether uncontrolled Class G, or controlled Class A, B, C, D or E), as well as weather related conditions such as wind speed and direction, temperature, barometric pressure, density altitude, measured ceiling, cloud tops, precipitation, visibility, status of weather as to IFR, VFR or MVFR, to name a few examples. In a further form, the user may specify a desire to search either all, current, or completed flights in order to target the information desired. For example, a pilot who owns a Cessna 310 may wish to search all completed Cessna 310 flights between New York and Boston in which the wind speed was above 20 mph in an easterly direction and visibility was over 3 miles. The pilot may then make a more informed decision concerning his flight plan for the same trip and similar weather conditions.

Once the query is received by service 10 at Web Server 11, the query is parsed and executed upon the database of current and historical flight information stored in data store 34. A result set is generated (stage 504) which may include a plurality of flights which closely match the query submitted by the user. In further forms, proximity searching is enabled to increase results in the event of a relatively small number of hits. The magnification of the map can be adaptively adjusted to include the selected number of hits over a wider space, to the extent permitted by the query results. The result set may be sorted based upon a relevancy score of any other criteria selected by the user either prior to of after the presentation of the results.

Once determined, the result set is presented to the user in a convenient form via their web browser (stage 506). The user is able to interact with the result set by sorting the results, clicking on individual results to obtain more information, or refine their query. Additionally, the user may click on advertisements to be taken to a resource for further information such as the web site of the advertiser. In a further form, the identified best result is initially displayed to the user in visual form. The query process ends at endpoint 508.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method for dynamically filtering flight tracking information prior to transmission to a central location comprising the steps of:
   receiving a transmission frequency protocol defining a predetermined outgoing data rate for reporting flight tracking information received with respect to a first flight, wherein said predetermined outgoing data rate is determined based upon at least one characteristic of said first flight selected from the group consisting of at gate, taxi, takeoff, cruising, speed, banking, altitude change, holding pattern, and turn;
   receiving a stream of flight tracking information from a substantially real-time source, wherein said stream includes positional information regarding a first flight which is received at an incoming rate;
   repetitively transmitting at least a portion of said positional information received in association with said first flight over a network to a remote server at at least said predetermined outgoing rate, wherein said predetermined outgoing rate is less frequent than or equal to said incoming rate;
   determining that said at least one characteristic of said first flight defined in the transmission frequency protocol has changed based on said flight tracking information; and
   altering said predetermined outgoing rate by at least 25% based upon said at least one characteristic of said first flight to establish a second predetermined outgoing rate, wherein said second predetermined outgoing rate is less frequent than said first rate; and
   repetitively transmitting at least a portion of said positional information received in association with said first flight over said network to said remote server at at least said second outgoing rate.

2. The method of claim 1, wherein said substantially real-time source includes automatic dependent surveillance broadcast (ADS-B) information.

3. The method of claim 2, wherein said substantially real-time source is an automatic dependent surveillance broadcast (ADS-B) transceiver.

4. The method of claim 2, wherein said first flight is a flight currently in-progress.

5. The method of claim 1, wherein said digital network comprises the Internet.

6. The method of claim 5, wherein said each of said repetitively transmitting is accomplished using the hypertext transfer protocol.

7. The method of claim 1, wherein said first rate is altered by at least 50%.

8. The method of claim 1, which additionally includes the step of comparing signal strength or signal to noise ratio data from an aircraft being received at two separate locations, and using the signal strength or signal to noise ratio data to select one location of the two separate locations to transmit the aircraft's data while disabling transmission of the aircraft's data from the other location.

9. The method of claim 1, wherein said positional information is determined based upon global positioning satellites.

10. A method for dynamically filtering flight tracking information prior to transmission to a central location while providing it subsequently in response to a request comprising the steps of:
    receiving a stream of flight tracking information for a first flight from a substantially real-time source, wherein said stream of flight tracking information is received at a first incoming rate, and wherein said stream includes positional information regarding said first flight;
    storing said positional information associated with said first flight in a ring buffer, wherein said storing overwrites historical flight tracking data received prior to said receiving a stream;
    repetitively transmitting the most recent positional information received in association with said first flight over a network to a remote server at at least a second predetermined outgoing rate, wherein said second predetermined outgoing rate is less frequent than said first incoming rate, and wherein said second rate is determined based upon at least one characteristic of said first flight selected from the group consisting of at gate, taxi, takeoff, cruising, speed, banking, altitude change, holding pattern, and turn;
    receiving a request to transmit any un-transmitted data associated with said first flight from said remote server; and
    transmitting all previously un-transmitted data associated with said first flight currently stored within said ring buffer to said remote server over said network.

11. A method for collecting flight tracking information from remote sources comprising the steps of:
    sending a transmission frequency protocol to a remote server which is connected to an automatic dependent surveillance broadcast (ADS-B) transceiver, wherein said transmission frequency protocol provides for the calculation of a first reporting rate based upon characteristics of a selected first flight determined from data received from said ADS-B transceiver;
    receiving flight tracking information for said first flight from said remote server which originated from said ADS-B transceiver at said first reporting rate;
    subsequently receiving flight tracking information for said first flight from said remote server which originated from said ADS-B transceiver at a second reporting rate, wherein said second reporting rate differs from said first reporting rate by at least 25%; and wherein said second rate is determined based upon said transmission frequency protocol and at least one characteristic of said first flight selected from the group consisting of at gate, taxi, takeoff, cruising, speed, banking, altitude change, holding pattern, and turn.

12. The method of claim 11, wherein said transmission frequency protocol includes a reporting rate adjustment based upon the altitude of a flight.

13. The method of claim 11, wherein said transmission frequency protocol includes a reporting rate adjustment based upon the airspeed of a flight.

14. The method of claim 11, wherein said transmission frequency protocol includes a reporting rate adjustment based upon the turn rate of a flight.

15. The method of claim 11, wherein said transmission frequency protocol includes a reporting rate adjustment based upon the rate of climb of a flight.

16. A method for dynamically filtering flight tracking information associated with a plurality of flights so as to accommodate a defined bandwidth limit in transmission to a central location comprising the steps of:
    receiving a stream of flight tracking information from a substantially real-time source, wherein said stream includes positional information regarding a plurality of flights, and wherein said flight tracking information includes flight characteristics selected from the group consisting of at gate, taxi, takeoff, cruising, speed, banking, altitude change, holding pattern, and turn for at least one of said plurality of flights;

repetitively transmitting at least a portion of said positional information received in association with each of said plurality of flights over a network to a remote server, wherein said positional information received in association with at least a first flight in said plurality is sent at a predetermined outgoing rate determined from said flight characteristics;

calculating an outgoing data rate corresponding to said repetitively transmitting;

determining that said outgoing data rate exceeds said defined bandwidth limit; and decreasing said outgoing rate by at least 5% based upon said outgoing data rate to establish a second outgoing rate; and repetitively transmitting at least a portion of said positional information received in association with each of said plurality of flights, wherein said positional information received in association with said first flight is transmitted at said second outgoing rate.

17. The method of claim 16, further comprising the steps of:

determining that at least one characteristic of said first flight has changed based on said flight tracking information; and altering said second outgoing rate by at least 25% based upon said at least one characteristic to establish a third outgoing rate, wherein said third outgoing rate is less frequent than or equal to said first rate.

18. The method of claim 16, further comprising the steps of:

calculating a second outgoing data rate corresponding to said second repetitively transmitting step;

determining that said second data rate is less than said defined bandwidth limit; and increasing said second outgoing rate by at least 5% based upon said second outgoing data rate to establish a third outgoing rate; and repetitively transmitting at least a portion of said positional information received in association with each of said plurality of flights, wherein said positional information received in association with said first flight is transmitted at at least said third outgoing rate.

19. The method of claim 16, wherein said substantially real-time source is an automatic dependent surveillance broadcast (ADS-B) transceiver.

20. The method of claim 16, wherein said digital network comprises a cellular modem at its proximate end.

* * * * *